United States Patent [19]

Moline

[11] 3,717,222
[45] Feb. 20, 1973

[54] DISPENSING APPARATUS FOR PACKING GREASE IN FRICTION BEARINGS AND THE LIKE

[76] Inventor: John H. Moline, 2425 Balsam Drive, Boulder, Colo. 80302

[22] Filed: Dec. 15, 1970

[21] Appl. No.: 98,234

[52] U.S. Cl. .................................. 184/1 D, 222/386
[51] Int. Cl. ............................................. F01m 11/00
[58] Field of Search............... 141/311, 383; 184/1 D; 239/320, 324, 508; 222/256, 257, 258, 259, 260, 325, 326, 327, 386, 391

[56] References Cited

UNITED STATES PATENTS

| | | | |
|---|---|---|---|
| 2,270,754 | 1/1942 | Ginter | 184/1 D |
| 597,648 | 1/1898 | Kellerman | 239/508 |
| 2,137,660 | 11/1938 | Welke | 141/383 X |
| 2,309,820 | 2/1943 | Berg | 184/1 D |

FOREIGN PATENTS OR APPLICATIONS

| | | | |
|---|---|---|---|
| 495,468 | 2/1937 | Australia | 184/1 D |

Primary Examiner—Robert B. Reeves
Assistant Examiner—L. Martin
Attorney—Reilly & Lewis

[57] ABSTRACT

The pressure gun of the present invention can be interchangeably used for dispensing grease, caulking or other viscous materials through utilization of a novel and improved insert nozzle and movable carrier frame.

9 Claims, 4 Drawing Figures

PATENTED FEB 20 1973
3,717,222
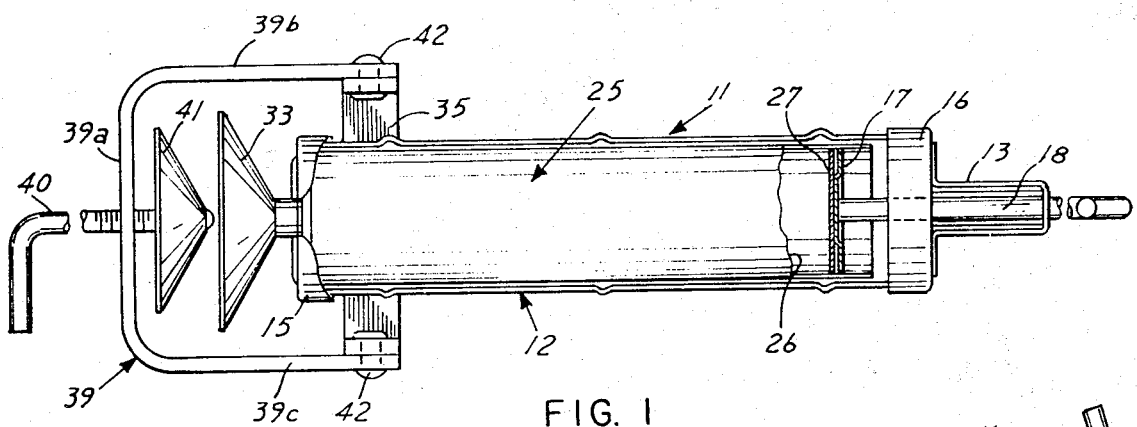
FIG. 1
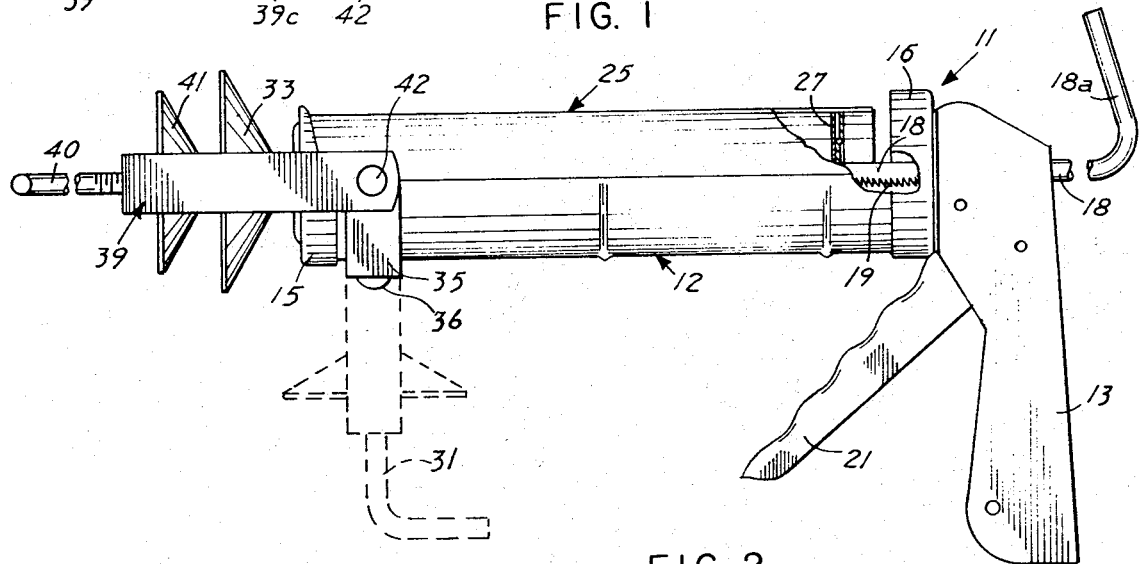
FIG. 2
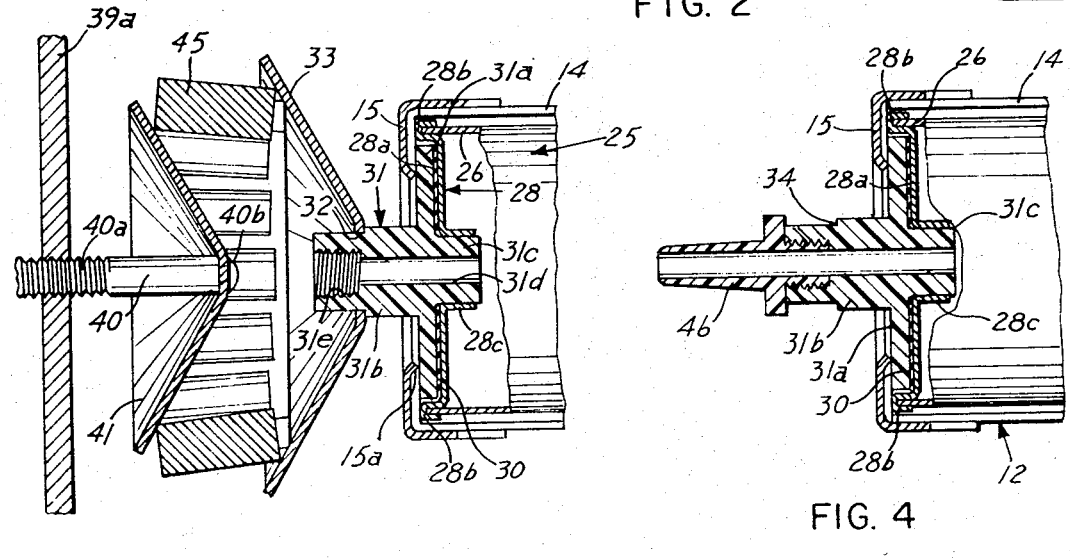
FIG. 3
FIG. 4
INVENTOR
JOHN H. MOLINE
BY
ATTORNEYS

DISPENSING APPARATUS FOR PACKING GREASE IN FRICTION BEARINGS AND THE LIKE

This invention relates to improvements in dispensing apparatus for viscous materials and is readily interchangeable for packing grease in bearings or for dispensing a caulking material as well as for the direct dispensing of a variety of viscous materials contained in replaceable cartridges.

Dispenser apparatus for packing grease into bearings has heretofore generally been confined to relatively bulky floor-supported structures. Portable or hand-held type grease packers suitable for lubricating friction bearings have been relatively complex, expensive to manufacture and have lacked the necessary versatility for making them readily suitable for dispensing other types of viscous materials. The usual grease packer apparatus loads the grease directly into the cylinder or chamber, which therefore frequently requires cleaning. Some attempts have been made to utilize prepacked cartridges in grease packer apparatus but they have not been entirely satisfactory for all applications.

Accordingly, it is an object of this invention to provide novel dispensing apparatus for a variety of viscous materials which is specifically adapted for packing grease in bearings and alternately for dispensing a variety of other viscous materials, such as, caulking materials contained in replaceable type cartridges.

Another object of this invention is to provide a novel hand-held type portable dispensing apparatus for viscous materials contained in replaceable cartridges which does not require cleaning of the pressure gun cylinder.

Yet a further object of this invention is to provide novel dispensing apparatus characterized by having a pair of opposed, spaced-apart bearing support members positioned forwardly of a nozzle which will clamp a friction bearing in place to receive grease under pressure from the nozzle in one position with one of the bearing support members being movable to a retracted position so that the nozzle of another cartridge may directly dispense other viscous materials if required.

In accordance with the present invention in a preferred embodiment shown there is provided dispensing apparatus including a pressure gun having a casing, a reciprocating piston in the casing and a replaceable cartridge filled with a desired viscous material to be dispensed. A rear bearing support member is removably supported in a centered position on a discharge nozzle extending forwardly from the front end of the cartridge. A movable carrier frame is mounted on the discharge end of the casing and pivots from an operable position extending forwardly of the nozzle to a retracted position to one side of the nozzle. A front bearing support member is supported on a connecting rod having external threads which is threaded into the carrier frame so that the front bearing support member is positioned in a spaced-apart coaxial alignment with the rear bearing support member and is adjustable to clamp a friction bearing between the bearing support members. In the retracted position for the carrier frame other viscous materials from a cartridge may be dispensed under pressure using the same pressure gun. An insert nozzle mounts on the front end of a replaceable cartridge and has an enlarged intermediate portion which fits in a recess between the front end walls of the pressure gun and cartridge and functions to reinforce the front end wall of the cartridge.

Other objects, advantages and capabilities of the present invention will become more apparent as the description proceeds taken in conjunction with the accompanying drawings in which:

FIG. 1 is a top plan view of dispensing apparatus embodying features of the present invention with portions of the replaceable cartridge broken away to show interior parts;

FIG. 2 is a side elevation view of the dispensing apparatus shown in FIG. 1 with the retracted position for the carrier frame being shown in dashed lines;

FIG. 3 is an enlarged fragmentary top plan view showing a friction bearing clamped in position on the end of the nozzle with portions broken away to shown interior construction for packing of the bearing with grease; and FIG. 4 is an enlarged fragmentary top plan view showing a nozzle and removable head mounted on the end of a cartridge suitable for dispensing caulking and like viscous materials.

Referring now to the drawings, in FIGS. 1 and 2 there is shown a conventional hand-held, manually operated pressure gun 11 similar to that presently in use for dispensing caulking material and the like. The pressure gun 11 includes an elongated cylindrical housing or casing 12 having a handle 13 depending from the rear end thereof. The casing includes a hollow, cylindrical section 14 having a generally semicircular cross section and arranged so that the upper half thereof is open to receive cartridges and front and rear caps or end members 15 and 16 are fitted over and fixedly secured to the ends thereof. A reciprocating piston 17 is slidably mounted in the casing and has a rod 18 extending through an aperture in the rear end member 16. Rod 18 is further supported for guided sliding movement in the upper portion of the handle at the rear of the end member 16 and rod 18 terminates at its rear end in a curved handle portion 18a suitable for grasping by the user. Rod 18 has a series of serrations or teeth 19 along one side which are engaged by a gear means (not shown) which is actuated by a depressing of the pivotal trigger 21 located forwardly of the handle 13 to progressively advance the piston in successive equal increments of travel along the inside of the casing from the rear toward the front end each time the trigger 21 is depressed. The rod is returned to the rear position shown by rotating it 180° and pulling it rearwardly.

A replaceable cartridge generally designated by numeral 25 is shown in an operable position in the casing. This cartridge 25 includes an elongated, hollow, cylindrical section 26, a rear end wall 27 and a front end wall 28. The rear end wall 27 is generally circular. Rear wall 27 is slidable through the tubular section 26 by the movement of the piston 17. The piston is slightly smaller than the internal diameter of the tubular section so as to slide freely therethrough. The front end wall 28 is recessed or inset relative to the front end wall of the casing to form a recessed area. The front end wall has a flat intermediate portion 28a, a forward annular flanged portion 28b extending forwardly from the outer edge of the intermediate portion, and a rear annular flanged portion 28c extending rearwardly from the inner edge of the intermediate portion to define a central discharge opening in the forward end wall. The outer annular flanged portion 28b is folded back over an outer edge of the tubular section and is preferably crimped thereto to affix it to the cylindrical section 26.

The nozzle 31 for the cartridge is made as a one-piece, hollow body, preferably of a plastic material. The nozzle includes a radially enlarged washer-like intermediate portion 31a and has a hollow cylindrical front end portion 31b and a hollow cylindrical rear end portion 31c on opposite sides of and coaxially aligned with the intermediate portion. The rear end portion 31b inserts into the rear annular flanged portion 28 and the inner surface of the washer-like intermediate portion 31a seats in the front end wall against the outer surface of the flat intermediate portion 28a and is flush with the outer edge of the forward annular portion 28b. The washer-like portion is preferably secured to the front end wall by an adhesive represented at 30. The front end portion 31b extends through a U-shaped slot in the front end cap 14. The washer-like intermediate portion is held against an inturned edge 15a of the front end cap defining the U-shaped slot and is held between the front end wall and front end cap 15 of the casing. The intermediate portion 31c, being rigid, serves to reinforce the forward end wall of the cartridge.

A rear bearing support member 33 is mounted on the nozzle 31 and this member has a dished or generally concave inner surface and is provided with a central aperture 32 permitting it to be slid on the front end portion 31b of the nozzle. The front end portion 31b has a stepped surface 34 for limiting the rearward movement of the inner bearing support member to a selected position. The rearwardly directed forces caused by clamping a bearing against the rear bearing support member are transferred to the intermediate portion of the nozzle.

A mounting bracket 35 is fastened to the underside of the casing by rivets 36 and has apertured end portions on opposite sides of the casing. A U-shaped carrier frame 39 is secured to the end of the casing and is arranged to support a front bearing support member 41 in a spaced-apart coaxial alignment with the rear bearing support member 33 by means of a connecting rod 40 having external threads 40a. The carrier frame 39 has an intermediate portion 39a and spaced parallel legs 39b and 39c extending from opposite ends of the intermediate portion. The rod 40 threads through internal threads in the center of intermediate portion 39a so that the rod will advance and retract in line with the longitudinal axis of the casing. A portion of the rear end of the rod has a reduced cross section and inserts into a central aperture in the front bearing support member and its rear end is bent or flattened as represented at 40b to hold the support member on the rear end of the rod. The legs of the carrier frame terminate in apertured end portions. A pivot member 42, shown as a rivet, extends through each of the apertured end portions of the carrier frame legs and an associated apertured end portion of the mounting bracket to support the carrier frame for pivotal movement relative to the casing. The pivot members 42 are arranged along a center line at right angles to and intersecting the longitudinal axis of the casing. This permits the frame to position the rod and the front bearing support member in a coaxially aligned position with the rear bearing support member and axis of the casing by pivoting the carrier frame to the outer extended position.

In the operation, a nozzle 31 is placed on the front end of the cartridge and secured thereto with an adhesive 30 along contacting surfaces thereof. The cartridge and nozzle assembly is inserted into the casing with the intermediate washer-like section 31a bearing against the front end cap in the manner shown in FIG. 3. The carrier frame 39 is extended to the operable position shown in full lines and a friction bearing represented at 45 is clamped between the support members 33 and 41 by threading rod 40 so that it moves rearwardly. The trigger 21 of the gun is then depressed advancing the piston 17 forwardly so as to force the grease through the nozzle 31. The bearing support members close the open ends of the bearing and deflect and direct the grease radially outwardly into the inside of the bearing to pack the grease in the bearing. If it is desired to use the gun for other applications, the carrier frame 39 is swung to a retracted position 31' as shown in dashed lines in FIG. 2. A removable head 46 is threaded into internal threads 31c in the central bore of the nozzle as shown in FIG. 4 so that caulking and like viscous materials can be dispensed under pressure using the same pressure gun.

Although the present invention has been described with a certain degree of particularity, it is understood that the present disclosure has been made by way of example and that changes in details of structure may be made without departing from the spirit thereof.

What is claimed is:

1. In apparatus for dispensing a viscous material under pressure wherein a cartridge containing the viscous material to be dispensed is mounted in an elongated cylindrical casing and has a discharge nozzle projecting from the front end of the cartridge and wherein a reciprocating piston is positioned in the casing and has a rod extending through one end thereof to apply pressure to the viscous material in the cartridge, wherein the improvement comprises:

a rear support member supported by the discharge nozzle; and a front support member supported by the casing in a spaced-apart, coaxial alignment with said rear support member so as to cooperate with said rear support member to support a friction bearing for receiving material under pressure from the discharge nozzle, said front support member being supported to move away from the front of said discharge nozzle to alternately support the friction bearing and move to a retracted position away from the front of the nozzle for other dispensing applications, said rear support member has a forwardly facing dished surface and a central aperture received by the end of the discharge nozzle and said front support member has a rearwardly facing generally tapered surface opposite the dished surface, said front support member being adjustably movable toward and away from the rear support member whereby to clamp the friction bearing between the opposed surfaces of said rear and front support members.

2. In apparatus as set forth in claim 1 wherein said support members have forwardly facing generally truncated cone-shaped surfaces each of which converges toward the discharge nozzle.

3. In apparatus as set forth in claim 1 further including a mounting bracket secured to the casing having oppositely disposed end portions and a U-shaped carrier frame having an intermediate end member and spaced parallel leg members extending from opposite ends of said end member, said legs being pivotally connected to said end portions to support the carrier frame for pivotal movement relative to the discharge end of said casing.

4. In apparatus as set forth in claim 3 wherein said mounting bracket has an intermediate portion shaped to conform to that of the casing, said mounting bracket extending along the underside of said casing and terminating in apertured end portions, and a pivot member extending through said apertured end portions and the free ends of said leg members for the pivotal support thereof, said pivot member being centered along a line transverse to and intersecting the longitudinal axis of the casing.

5. In apparatus for dispensing viscous materials under pressure wherein a pressure gun includes a reciprocating piston positioned in an elongated cylindrical casing, wherein the improvement comprises:
   a replaceable cartridge supported in the casing having a hollow cylindrical body containing a viscous material and having a discharge nozzle projecting forwardly of the front end of said cartridge;
   a rear support member removably mounted on the discharge nozzle;
   a carrier frame pivotally mounted on the discharge end of the casing and extending externally along the axis of the casing and movable to a retracted position at right angles to the horizontal axis of the casing away from the front of the nozzle; and
   a front support member supported on a rod connected to the carrier frame in a spaced-apart coaxial alignment with the rear support member and cooperating with said rear support member to support a friction bearing in a material receiving relation to the discharge nozzle, to alternately support an article and move to a retracted position away from the front of the nozzle for other dispensing applications.

6. In apparatus as set forth in claim 6 wherein said discharge nozzle is a one-piece generally cylindrical body having a central bore, said nozzle having an enlarged intermediate washer-like portion disposed on the forward end wall of the cartridge and casing, a narrower rear end portion extending into the discharge opening of the cartridge and a narrower forward end portion having a stepped surface providing a seat for the inner bearing support member.

7. In apparatus as set forth in claim 5 wherein said discharge nozzle is formed as a one-piece integral body having a central discharge bore and made from a plastic material.

8. In apparatus as set forth in claim 7 further including a removable head threadedly secured in the outlet end of the central bore of the discharge nozzle.

9. In apparatus as set forth in claim 8 wherein said intermediate portion of the discharge nozzle is adhesively secured to the front end wall of the cartridge.

* * * * *